(12) United States Patent
Di Maio et al.

(10) Patent No.: US 12,026,682 B2
(45) Date of Patent: Jul. 2, 2024

(54) METHOD AND SYSTEM TO CONVERT DEMOLISHED CONCRETE INTO A READILY RECYCLABLE PRODUCT

(71) Applicant: C2CA Technology B.V., Utrecht (NL)

(72) Inventors: Francesco Di Maio, Delft (NL); Peter Carlo Rem, Delft (NL); Shyama Prasad Banerjee, Delft (NL); Simon Petrus Maria Berkhout, Delft (NL); Giel Hermans, Delft (NL); Abraham Teklay Gebremariam, Delft (NL)

(73) Assignee: C2CA Technology B.V., Utrecht (NL)

( * ) Notice: Subject to any disclaimer, the term of this patent is extended or adjusted under 35 U.S.C. 154(b) by 508 days.

(21) Appl. No.: 17/207,271

(22) Filed: Mar. 19, 2021

(65) Prior Publication Data

US 2021/0209564 A1  Jul. 8, 2021

Related U.S. Application Data

(63) Continuation of application No. PCT/NL2019/050653, filed on Sep. 30, 2019.

(30) Foreign Application Priority Data

Oct. 3, 2018 (NL) .................. 2021751

(51) Int. Cl.
*G06Q 10/30* (2023.01)
*G06F 16/25* (2019.01)
*G06K 19/07* (2006.01)

(52) U.S. Cl.
CPC .......... *G06Q 10/30* (2013.01); *G06F 16/252* (2019.01); *G06K 19/0723* (2013.01)

(58) Field of Classification Search
None
See application file for complete search history.

(56) References Cited

U.S. PATENT DOCUMENTS

2011/0000402 A1* 1/2011 Grasso, Jr. .............. C04B 28/04
106/713
2017/0116445 A1* 4/2017 Debates ........... G06K 19/07345

FOREIGN PATENT DOCUMENTS

DE   102015122818 A1  6/2017
WO   2018165669 A1    9/2018
WO   2020071906 A1    4/2020

OTHER PUBLICATIONS

US DOT FHA, "Use of Radio Frequency Identification Tags in Pavements," Publication No. FHWA-HRT-14-061, Apr. 2015. (Year: 2015).*

(Continued)

*Primary Examiner* — Jan P Mincarelli
(74) *Attorney, Agent, or Firm* — Peacock Law P.C.; Philip D. Askenazy; Justin R. Muehlmeyer

(57) ABSTRACT

Method and system to convert demolished concrete into a readily recyclable product which is capable to reliably replace virgin feedstock that is used for manufacturing concrete, wherein converting the demolished concrete into the readily recyclable product comprises adding a plurality of information carriers to said product, wherein the plurality of information carriers are regularly distributed into said product by securing that each separate fraction of the product will hold a dedicated information carrier, and wherein each such dedicated information carrier is arranged to refer to information that is characteristic for the fraction of the product in which the dedicated information carrier is contained.

14 Claims, 1 Drawing Sheet

(56) References Cited

OTHER PUBLICATIONS

Cochran, Kimberly Marie, "Construction and Demolition Debris Recycling: Methods,", a Dissertation Presented to the Graduate School of the University of Florida in Partial Fulfillment of the Requirements for the Degree of Doctor of Philosophy, 2006, 1-185.

Wang, Lung-Chuang, "Enhancing construction quality inspection and management using RFID technology", Automation in Construction, vol. 17, 2008, 467-479.

Xia, Han, et al., "Single-shot LIBS spectral quality for waste particles in open air", Technisches Messen vol. 82, No. 12, 2015, 606-615.

* cited by examiner

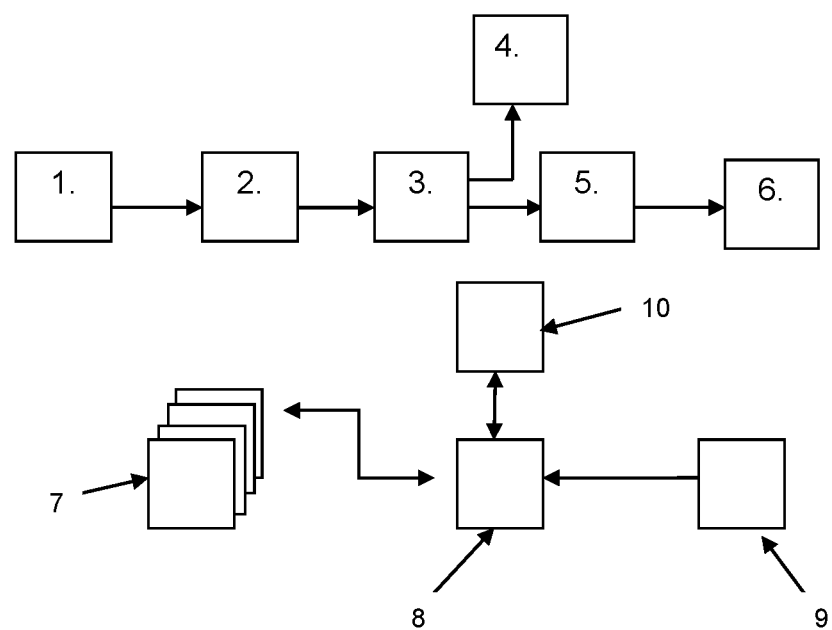

METHOD AND SYSTEM TO CONVERT DEMOLISHED CONCRETE INTO A READILY RECYCLABLE PRODUCT

CROSS-REFERENCE TO RELATED APPLICATIONS

This application is a continuation of PCT/NL2019/050653, titled "METHOD AND SYSTEM TO CONVERT DEMOLISHED CONCRETE INTO A READILY RECYCLABLE PRODUCT", filed on Sep. 30, 2019, which claims priority to Netherlands Patent Application No. 2021751, titled "METHOD AND SYSTEM TO CONVERT DEMOLISHED CONCRETE INTO A READILY RECYCLABLE PRODUCT", filed on Oct. 3, 2018, and the specification and claims thereof are incorporated herein by reference.

BACKGROUND OF THE INVENTION

Field of the Invention

Embodiments of the present invention relate to a method to convert demolished concrete into a readily recyclable product which is capable to reliably replace virgin feedstock that is used for manufacturing concrete. Embodiments of the present invention also relate to a system for implementing this method.

Background Art

The dissertation by Kimberly Mary Cochran presented to the graduate school of the University of Florida in 2006 and entitled "CONSTRUCTION AND DEMOLITION DEBRIS RECYCLING: METHODS, MARKETS, AND POLICY" reports that concrete can be recycled into most markets that are currently satisfied by crushed stone. The most common markets for recycled concrete are those in construction, specifically road base (86%), asphalt concrete (8%), and general fill (6%). If concrete is recycled, benefits are accrued through the reduction in need of virgin aggregates that the recycled aggregate is able to replace.

The replacement of virgin aggregates is however hampered because the industry is hesitant to replace primary by secondary raw materials. The industry perceives recycled material to be subject to a high variability in quality, and that there is a high cost associated in determining the usability of a recycled product which is intended to replace virgin feedstock for the manufacture of concrete. If the quality of the recycled material is not up to standard, the reliability of the construction manufactured from concrete based on such recycled product is not guaranteed.

It is known from the article "Enhancing construction quality inspection and management using RFID technology", by Lung-Chuang Wang, Automation in Construction 17 (2008), pages 467-479 to provide plural RFID tags into a mixture of concrete from different construction sites. The RFID tags of this article are intended to support a quality management system which functions as a platform for gathering, filtering, managing, monitoring and sharing quality data in order to enhance automated data collection and information management in a quality test lab.

US2011/0000402 discloses a method to convert demolished concrete into a recyclable product which is capable to replace virgin feed-stock that is used for manufacturing concrete, wherein in various stages a plurality of information carriers is added to said product, including a moment immediately or shortly after demolishing the concrete. The information carriers are for instance embodied as RFID tags or simply barcoded paper or plastic sheets containing serial numbers and/or other information. The tags are applied to the containers/units prior to said container/units being loaded with the recyclable material. After loading the containers/units with the recyclable material, the tags are scanned and information relating to these tags and the recyclable material in the containers/units are stored in a database. This system and method is sensitive to fraud and have poor reliability. If alien product is added to the recyclable material in the containers/units, and the information in the tags that are provided on the containers/units is accordingly updated, or even simply and in accordance with the disclosure of US2011/0000402 later tags are applied to the containers/units to replace the tag that was placed originally, a reliable tracking of the recyclable material from its origin to its destination is compromised.

BRIEF SUMMARY OF THE INVENTION

It is an object of the invention to provide a method and system to convert demolished concrete into a readily recyclable real-life product which is capable to reliably replace virgin feedstock that is used for manufacturing concrete, and to abolish the need to involve a test lab for situations that doubts would arise about the quality and suitability of the demolished concrete as a recycled product for replacement of virgin feedstock.

It is another object of the invention to provide real-time available information on the demolished concrete which characterizes said concrete on a high-resolution basis, meaning that the information will not so much relate to the demolished concrete in bulk as is the case in US2011/0000402, but will relate to the demolished concrete in fine enough fractions to support a reliable replacement of virgin feedstock by these fractions.

In connection with these objectives, it should be understood that crushed concrete (before processing into a high-grade aggregate) typically makes 0-5 euro/ton on the market. After processing and passing quality checks, the value increases to 12-20 euro/ton. Analysis of a single sample (including the costs of sampling and handling) in a company-based lab costs appr. 50 euro and is therefore because of costs in practice not an option to apply. Nevertheless, essential contaminants like wood bring down the value of aggregate products back again to about minus 5 to 0 euro/ton and the presence of asbestos means that land filling costs will be incurred of approximately 100 euro/ton. Potential buyers of recycle aggregate are therefore in the difficult position that if all is well, the prices to be paid for the material do not allow laboratory analysis checks, while if the material is tampered with, the costs of landfilling or breaking down buildings are unacceptable. It is therefore an object of the invention to provide a solution for this dilemma.

The method and system of the invention are for this purpose provided with the features of one or more of the appended claims.

In one aspect of the invention, converting the demolished concrete into the readily recyclable product comprises adding a plurality of information carriers to said product immediately or shortly after demolishing the concrete, wherein the plurality of information carriers are regularly distributed into the product itself by securing that each separate fraction of the product will hold a dedicated information carrier, and wherein each such dedicated information carrier is arranged to refer to information that is characteristic for the fraction of the product in which the dedicated information carrier is contained. This increases the transparency of the recycled product and provides a reliable and easy way to access information defining such recycled product and the parties involved that handle the demolished concrete and the recycled product. The information can thus relate to quality, properties of the demolished concrete, manner of demolishing, original application and location of the demolished concrete, manner of transportation, owner of the original building, the concentration of information carriers in the product, etc. In particular, the information can help users of the product to design an optimal recipe for new concrete, including e.g., the amount of cement, water, superplasticizer that is to be added to the recycled product, taking into account the quality of the recycled product and the intended application of the new concrete.

Preferably the dedicated information carriers are provided to the fractions of the recyclable product with dimensions matching sieve sizes of the respective fractions of the product, which in practice may amount to preferably a dimension equal to approximately 4 mm. The dimension of 4 mm corresponds to the upper and lower limit of generally applied sieve fractions of the recyclable product, which normally range from 0-4 millimeter and 4-12 millimeter, respectively. Seeving out the information carriers from the respective fractions of the recyclable product is then virtually impossible.

It is further preferred that the information carriers are provided with an outer shell made from a ceramic material, which makes it difficult if not impossible to distinguish the information carriers from the recyclable product.

Suitably the dedicated information carriers are provided in the form of RFID tags. RFID tags are easily noticeable by cost-effective RFID readers and their presence can thus be established even if the tags are not visible and embedded in the recycled product.

It is found beneficial that each fraction of the product is provided to weigh approximately 1 ton. This provides a sufficiently dense distribution of information carriers in the recycled product to support a reliable characterization of this product as is, or as contained in a construction made from it, wherein unallowable deviations of the required specification of the recycled product can accurately be assessed.

It is further preferable that each information carrier is uniquely identified with an identifier such that the identifier of any such information carrier corresponds to an entry in a database, and wherein said entry holds the information that characterizes the fraction of the product in which the information carrier is contained. Access to the information then simply requires access to the database in which the information is contained.

It is further preferable that the information carrier has a size, material surface, and robustness that makes it compatible with the intended application in new concrete, e.g., by applying an outer shell made from a ceramic material and in a size that is within the range of the particle size of the recycled product.

To promote the benefits of the invention it is desirable that converting the demolished concrete into the readily recyclable product comprises analyzing properties of the demolished concrete and feeding the database with the established properties.

A desirable aspect of the invention is further that analyzing the properties of the demolished concrete is done in line and based on real time measurements during conversion of the demolished concrete into the readily recyclable product. This brings about a tremendous advantage over the prior art in which it is required to execute time-consuming testing procedures when doubts arise about the quality of recycled concrete. These prior arts testing procedures may take up to 30 days, whereas the invention provides that the properties are monitored in real time and stored in the database to be immediately accessible for the user in the intended application. This saves costs of transporting and storing batches of the product in separate piles in facilities away from the source or final destination until the quality of the recycled product is established.

In a preferred embodiment of the method of the invention converting the demolished concrete into the readily recyclable product comprises crushing of the demolished concrete into coarse and fine fractions.

It is further advantageous that analyzing the properties of the demolished concrete comprises monitoring a stream of concrete fractions by laser induced breakdown spectroscopy to derive the properties of these concrete fractions. Laser induced breakdown spectroscopy to analyze concrete waste is known from the article "Single-shot LIBS spectral quality for waste particles in open air" by Han Xia and Maarten C. M. Bakker, Technisches Messen 2015; 82(12): 606-615. Laser induced breakdown spectroscopy is able to deliver many thousands of chemometric point analyses to characterize the respective fractions of the demolished concrete to comprise at least one of the groups comprising concentration of pollutants, chemical composition, dry binder/cement paste material.

It is preferred that the laser induced breakdown spectroscopy provides the properties of the concrete fractions at a rate of approximately 30-100 analyses per second and that several thousands of these analyses are combined into an average/standard deviation that is used for documenting the analyzed fraction of the recycled product.

Embodiments of the present invention are also directed to a system for implementing the method according to the invention, which system comprises a plurality of information carriers that are individualized by a unique identifier provided on each concerning information carrier, wherein the system further comprises a database with a plurality of entries, each entry corresponding to one identifier of an information carrier intended to be embedded in a fraction of demolished concrete, and the system further comprising at least one laser induced breakdown spectroscopy facility that is connected to the database for feeding the database with information characteristic for respective fractions of demolished concrete, such that each entry in the database that is identified with an identifier of an information carrier is equipped to hold information regarding such fraction of demolished concrete that is identified with the information carrier that is embedded in said fraction of demolished concrete.

Preferably the database of the system is accessible by a trading platform for the demolished concrete that is according to the invention converted into a readily recyclable product. The trading platform can provide users access to the information in the database that characterizes the recycled product to enable such users to assess whether the product is usable for their intended purposes.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings:

FIG. 1 is a schematic illustration of a method and system according to an embodiment of the present invention.

DETAILED DESCRIPTION OF THE INVENTION

Referring to FIG. 1, reference 1 represents the step of demolishing concrete. Following demolition step 1, reference 2 represents the step of crushing of the concrete into coarse and fine fractions.

Immediately or shortly after the demolition step 1, and preferably after crushing in step 2, the properties of the respective fractions of the concrete are established in step 3. For this purpose, preferably use is made of a laser induced breakdown spectroscopy device 9 which is connected to database 8 that can receive from said device 9 the information pertaining to the fractions of the demolished and crushed concrete. This information preferably relates to concentration of pollutants, chemical composition, dry binder/cement paste material.

About at the same time, simultaneously with, concurrently with, and/or subsequent to when the laser induced breakdown spectroscopy device 9 provides its information to the database 8 pertaining to the fraction of the concrete being measured, one of a plurality of information carriers 7 is preferably embedded in the fraction that is being or has been measured by the laser induced breakdown spectroscopy device 9. This information carrier 7 is uniquely identified with an identifier which is also provided in the database 8, such that the identifier of such information carrier 7 corresponds to a particular entry in the database 8. Accordingly, said entry of the database 8 thus can correspond to the information that is being provided to the database 8 by the laser induced breakdown spectroscopy device 9. The fraction of the product in which the information carrier 7 is embedded is thus characterized by the information provided to the database 8, and this information can at all times be retrieved using this particular identifier that is provided on the information carrier 7 which is embedded in the recycled product. In the database 8 the identifier will thus specifically refer to information, including but not limited to information related to quality, properties of the demolished concrete, manner of demolishing, original application and location of the demolished concrete, manner of transportation, owner of the original building etc, all pertaining to the fraction of the recycled product in which the information carrier 7 with the concerning identifier is embedded.

FIG. 1 further shows that database 8 is accessible by a trading platform 10 for the demolished concrete.

The following table is an example of the parameters/properties that can be included in database 8 for any type of recycled product that has been examined.

| Property | Measuring ablity of system | Acceptable range | Measured value | Standards |
| --- | --- | --- | --- | --- |
| Particle size distribution | — | — | X | EN 933-1 |
| Particle shape-flakiness index | 0-50% | <35% | X | EN 933-3 |
| Resistance to freezing and thawing | 0-10% | <4 | X | EN 1367-1 |
| Resistance to fragmentation (Los Angeles abrasion test) | 0-50% | 20-40% | X | EN 1097-2 |
| Particle density | 0-5.1 | 2.1-2.4 | X | EN 1097-6 |
| Water absorption | 0-15% | 3.7%-8.7% | X | EN 1097-7 |
| Content of fine particles 63 μm | 0-10% | <1.5% | X | EN 933-1 |
| Resistance to abrasion (Micro Deval) | 0-50% | 13%-20% | X | EN 1097-1 |
| Floating material (wood, plastics, foam) | 0-10% | <0.5% | X | EN 933-11 |
| Chlorides content | 0-1% | <0.01% | X | EN 1744-5 |
| Sulphates | 0-10% | <0.8% | X | EN 1744-1 |

Although the invention has been discussed in the foregoing with reference to an exemplary embodiment of the method and system of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

Optionally, embodiments of the present invention can include a general or specific purpose computer or distributed system programmed with computer software implementing steps described above, which computer software may be in any appropriate computer language, including but not limited to C++, FORTRAN, BASIC, Java, Python, Linux, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. One or more processors and/or microcontrollers can operate via instructions of the computer code and the software is preferably stored on one or more tangible non-transitive memory-storage devices. All computer software disclosed herein may be embodied on any non-transitory computer-readable medium (including combinations of mediums), including without limitation CD-ROMs, DVD-ROMs, hard drives (local or network storage device), USB keys, other removable drives, ROM, and firmware.

Note that in the specification and claims, "about" or "approximately" means within twenty percent (20%) of the numerical amount cited.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

The invention claimed is:

1. A method to convert demolished concrete into a readily recyclable product which is capable to reliably replace virgin feedstock that is used for manufacturing concrete, wherein a plurality of information carriers is added to said product, wherein the plurality of information carriers are added immediately or shortly after demolishing the concrete, wherein the information carriers are regularly distributed and embedded into said product by securing that each separate fraction of the product will hold a dedicated information carrier with a dimension matching at least one of a plurality of sieve sizes of the respective fractions of the product, wherein each such dedicated information carrier is arranged to refer to information that is characteristic for the fraction of the product in which the dedicated information carrier is contained.

2. The method according to claim 1, wherein the dimension is equal to approximately 4 mm.

3. The method according to claim 1, wherein the information carriers are provided with an outer shell made from a ceramic material.

4. The method according to claim 1, wherein the dedicated information carriers are provided in the form of RFID tags.

5. The method according to claim 1, wherein each fraction of the product is provided to weigh approximately 1 ton.

6. The method according to claim 1, wherein each information carrier is uniquely identified with an identifier such that the identifier of such information carrier corresponds to an entry in a database, wherein said entry holds the information that characterizes the fraction of the product in which the information carrier is contained.

7. The method according to claim 6, wherein converting the demolished concrete into the readily recyclable product comprises analyzing properties of the demolished concrete and feeding the database with the established properties.

8. The method according to claim 7, wherein analyzing the properties of the demolished concrete is done in line and based on real time measurements during conversion of the demolished concrete into the readily recyclable product.

9. The method according to claim 1, further comprising crushing the demolished concrete into coarse and fine fractions.

10. The method according to claim 7, wherein analyzing the properties of the demolished concrete further comprises monitoring a stream of concrete fractions by laser induced breakdown spectroscopy to derive the properties of the concrete fractions.

11. The method according to claim 10, wherein said properties of the respective fractions of the demolished concrete comprise at least one of the groups consisting of: concentration of pollutants, chemical composition, and dry binder/cement paste material.

12. The method according to claim 10, wherein the laser induced breakdown spectroscopy provides the properties of the concrete fractions at a rate of approximately 30-100 analyses per second.

13. A system for implementing the method according to claim 1, wherein the system comprises a plurality of information carriers, wherein the information carriers are individualized by a unique identifier provided on a concerning information carrier, wherein the system further comprises a database with a plurality of entries, each entry corresponding to one identifier of an information carrier, characterized in that the system further comprises a laser induced breakdown spectroscopy facility that is connected to the database for feeding the database with information characteristic for fractions of demolished concrete, such that each entry in the database that is identified with an identifier of an information carrier is equipped to hold information regarding such fraction of demolished concrete that is identified with said information carrier that is provided in said fraction of demolished concrete, and that the information carriers have an outer shell made from a ceramic material.

14. The system according to claim 13, wherein the database is accessible by a trading platform for the demolished concrete that is converted into a readily recyclable product.

* * * * *